US009393850B2

(12) United States Patent
Kuroda

(10) Patent No.: US 9,393,850 B2
(45) Date of Patent: Jul. 19, 2016

(54) STABILIZER LINK AND MANUFACTURING METHOD THEREFOR

(71) Applicant: NHK SPRING CO., LTD., Yokohama-shi, Kanagawa (JP)

(72) Inventor: Shigeru Kuroda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 22 days.

(21) Appl. No.: 14/408,201

(22) PCT Filed: May 22, 2013

(86) PCT No.: PCT/JP2013/064817
§ 371 (c)(1),
(2) Date: Dec. 15, 2014

(87) PCT Pub. No.: WO2013/187223
PCT Pub. Date: Dec. 19, 2013

(65) Prior Publication Data
US 2015/0151605 A1    Jun. 4, 2015

(30) Foreign Application Priority Data

Jun. 15, 2012  (JP) ................................ 2012-136254

(51) Int. Cl.
*B60G 21/055*  (2006.01)
*F16C 3/02*   (2006.01)
(Continued)

(52) U.S. Cl.
CPC ........ *B60G 21/0551* (2013.01); *B29C 45/0005* (2013.01); *B29C 45/0025* (2013.01);
(Continued)

(58) Field of Classification Search
CPC ............... B60G 21/0551; B60G 7/001; B60G 2206/014; B60G 2206/7101; B60G 2204/1224; B60G 2204/416; B60G 2206/11; B29C 70/12; B29C 45/0005; B29C 70/14; B29C 70/62; B29C 45/0025; F16C 11/0638; F16C 11/0642; F16C 11/0671; F16C 3/02; B29K 2077/00; B29K 2311/10
USPC .................................................... 280/124.107
See application file for complete search history.

(56) References Cited

U.S. PATENT DOCUMENTS 4,546,958 A  * 10/1985  Ohno ..................... B60G 11/02
                                                    267/148
5,427,467 A    6/1995  Sugiura
(Continued)

FOREIGN PATENT DOCUMENTS

JP    H06-117429 A    4/1994
WO   2015/049739 A1   4/2015

OTHER PUBLICATIONS

Jan. 29, 2016 Extended Search Report issued in European Patent Application No. 13804013.4.

*Primary Examiner* — Karen Beck
(74) *Attorney, Agent, or Firm* — Oliff PLC

(57) ABSTRACT

A stabilizer link and a manufacturing method therefor which can ensure strength required in wing plates and a center supporting plate and in a support bar, and which can ensure strength required in ribs. The support bar has a top wing plate, a bottom wing plate, a center supporting plate, and a plurality of ribs. In the wing plates and the center supporting plate, reinforcing fiber is orientated to a longitudinal direction of the support bar. In the rib, the reinforcing fiber is orientated to a perpendicular direction of the support bar. A longitudinal orientation ratio D1 at a longitudinal center portion of the top wing plate and the bottom wing plate, a perpendicular orientation ratio D2 at a perpendicular center portion of the ribs, and a perpendicular orientation ratio D3 at a perpendicular end portion of the ribs satisfy Equation 1.

D1>D2>D3                                    Equation 1

12 Claims, 13 Drawing Sheets

(51) Int. Cl.
  *F16C 11/06* (2006.01)
  *B29C 70/12* (2006.01)
  *B29C 45/00* (2006.01)
  *B60G 7/00* (2006.01)
  *B29C 70/14* (2006.01)
  *B29C 70/62* (2006.01)
  *B29K 77/00* (2006.01)
  *B29K 311/10* (2006.01)

(52) U.S. Cl.
  CPC .............. *B29C70/12* (2013.01); *B60G 7/001* (2013.01); *F16C 3/02* (2013.01); *F16C 11/0638* (2013.01); *F16C 11/0642* (2013.01); *F16C 11/0671* (2013.01); *F16C 11/0695* (2013.01); *B29C 70/14* (2013.01); *B29C 70/62* (2013.01); *B29K 2077/00* (2013.01); *B29K 2311/10* (2013.01); *B60G 2204/1224* (2013.01); *B60G 2204/416* (2013.01); *B60G 2206/014* (2013.01); *B60G 2206/11* (2013.01); *B60G 2206/7101* (2013.01)

(56) References Cited

U.S. PATENT DOCUMENTS

| | | | |
|---|---|---|---|
| 8,950,766 B2 * | 2/2015 | Schonen | B60G 11/02 280/124.17 |
| 2008/0090477 A1 * | 4/2008 | Balthes | B29C 43/003 442/136 |
| 2009/0082117 A1 * | 3/2009 | Sakurai | B21J 5/12 464/183 |
| 2010/0299108 A1 * | 11/2010 | Glaser | G06F 17/5018 703/1 |
| 2011/0001350 A1 * | 1/2011 | Schmitz | B60G 9/003 301/124.1 |
| 2011/0260424 A1 * | 10/2011 | Pollymeyer | B60G 3/10 280/124.171 |
| 2013/0147148 A1 * | 6/2013 | Kuroda | F16C 11/0642 280/124.152 |
| 2014/0110964 A1 * | 4/2014 | Schijve | B29C 45/006 296/146.6 |
| 2015/0001824 A1 * | 1/2015 | Kuroda | B60G 7/005 280/124.106 |
| 2015/0001826 A1 * | 1/2015 | Hosoi | B60G 7/001 280/124.134 |
| 2015/0151605 A1 * | 6/2015 | Kuroda | B60G 21/0551 280/124.107 |
| 2015/0239319 A1 * | 8/2015 | Kuroda | B60G 21/055 267/141 |
| 2015/0291746 A1 * | 10/2015 | Kosonen | C08L 23/12 428/221 |
| 2015/0343875 A1 * | 12/2015 | Spiegel | B60G 11/02 280/5.515 |
| 2016/0052565 A1 * | 2/2016 | Shi | B29C 70/08 428/36.4 |

\* cited by examiner gate side

50mm

50mm stabilizer link bottom wing plate (wing plate at gate side)

center supporting plate rib top wing plate (wing plate at opposite side)

5mm macro view of bottom wing plate (wing plate at gate side)
(cross sectional observation of portion I in Fig. 8B)

orientation direction of primary fiber
⟵⎯⎯⟶ enlarged view of center portion at left side
(enlarged view of portion A in Fig. 9)

enlarged view of center portion
(enlarged view of portion B in Fig. 9)

enlarged view of center portion at right side
(enlarged view of portion C in Fig. 9)

macro view of rib and vicinity thereof
(cross sectional observation of portion II in Fig. 8B)

enlarged view of bottom wing plate
(enlarged view of portion D in Fig. 11)

enlarged view of top wing plate
(enlarged view of portion H in Fig. 11)

orientation direction
of primary fiber enlarged view of end portion at gate side
(enlarged view of portion E in Fig. 11)

enlarged view of center portion
(enlarged view of portion F in Fig. 11)

enlarged view of end portion at opposite side
(enlarged view of portion G in Fig. 11)

macro view of center supporting plate
(cross sectional observation of portion III in Fig. 8B)

orientation direction of primary fiber
←——————→ enlarged view of center portion at left side
(enlarged view of portion I in Fig. 14)

enlarged view of center portion
(enlarged view of portion J in Fig. 14)

enlarged view of center portion at right side
(enlarged view of portion K in Fig. 14)

STABILIZER LINK AND MANUFACTURING METHOD THEREFOR

TECHNICAL FIELD

The present invention relates to a stabilizer link having a support bar, and in particular, relates to an improving technique of a resin support bar.

BACKGROUND ART

A stabilizer is a ball joint part connecting an arm or a strut of a suspension apparatus and a stabilizer apparatus. FIG. 1 is a perspective view showing a schematic structure of a front side wheel of a vehicle. Each suspension apparatus 1 is provided at left and right tires 4 and has an arm 11 and a cylinder 12. A lower end portion of the arm 11 is fixed at a bearing supporting a shaft of the tire 4. The cylinder 12 is elastically movable relatively to the arm 11. A bracket 13, to which a stabilizer link 3 is mounted, is provided at the arm 11. The suspension apparatus 1 supports the weight of a vehicle body that is applied to the tire 4. A stabilizer apparatus 2 is equipped with a bar 21 that is approximately U-shaped, and the stabilizer apparatus 2 is mounted to the vehicle body via bushes 22. The stabilizer apparatus 2 secures rolling stiffness of the vehicle.

The stabilizer links 3 are provided at the bracket 13 of the suspension apparatus 1 and at the end portion of the bar 21 of the stabilizer apparatus 2. The stabilizer links 3 are connected to each other by a support bar 70. The stabilizer link 3 transmits a load, which is generated when the suspension apparatus 1 receives an input from a road surface, to the stabilizer apparatus 2.

FIG. 2 is a side sectional diagram showing a portion of a structure of a specific example of the stabilizer link 3. The stabilizer link 3 is equipped with a ball stud 30, a ball seat 40, a housing 50, and a dust cover 60.

The ball stud 30 has a stud portion 31 and a ball portion 32 which are integrally formed. The stud portion 31 has a tapered portion 33, a straight portion 34, and a screw portion 35. The tapered portion 33 is formed at an upper end portion of the ball portion 32. A collar portion 36 and a projection portion 37 are formed at an upper end portion and a lower end portion of the straight portion 34. An upper end fixing portion 61 of the dust cover 60 abuts between the collar portion 36 and the projection portion 37 at the straight portion 34 so as to be fixed therebetween. The screw portion 35 of the stabilizer link 3 proximate to the suspension apparatus 1 is fixed at the bracket 13 of the arm 11 by screw fastening, and the screw portion 35 of the stabilizer link 3 proximate to the stabilizer apparatus 2 is fixed at the bar 21 by screw fastening.

The ball seat 40 and the housing 50 form a pivot support member that universally supports the ball stud 30. The ball portion 32 of the ball stud 30 is press-fitted into the ball seat 40. The housing 50 holds the ball seat 40 therein. A lower end fixing portion 62 of the dust cover 60 is held between flange portions 41 and 51 of the ball seat 40 and the housing 50. Thermal caulking portions 42 are formed at a bottom portion of the ball seat 40. Each thermal caulking portion 42 projects through a hole 52 of a bottom portion of the housing 50, and a leading end portion of the thermal caulking portion 42 engages with a lower surface portion of the housing 50 (for example, Patent Document 1).

As a material of the housing 50 and the support bar 70, iron can be used. The housing 50 and the support bar 70 are molded in a different shape, respectively, and the support bar 70 is connected to the housing 50 by welding such as resistance welding, etc.

In recent years, in order to reduce the weights of stabilizer links, resin is used as a material for the support bar, and the support bar is formed by an injection molding. In the resin used for the injection molding, a reinforcing fiber such as a fine grass fiber, etc., is usually included.

In a stabilizer link 5 shown in FIG. 3, for example, a housing 80 and a support bar 90 made of resin are integrally molded. The support bar 90 has a top wing plate 91, a bottom wing plate 92, a center supporting plate 93, and ribs 94A and 94B, as shown in FIG. 3A. The wing plates 91 and 92 and the center supporting plate 93 are portions for ensuring longitudinal strength of the support bar 90, and two stabilizer links 5 are connected by extending them in a longitudinal direction. The top wing plate 91 and the bottom wing plate 92 are arranged at an upper end portion and a lower end portion of the center supporting plate 93, and horizontally protrude from the center supporting plate 93 as show in FIG. 3B. In this way, the top wing plate 91, the bottom wing plate 92 and the center supporting plate 93 are arranged, so that a cross section perpendicular to a longitudinal direction has an I shape.

The ribs 94A and 94B are formed between the wing plates 91 and 92, and are portions for ensuring perpendicular strength. The rib 94A is arranged at a longitudinal center portion of the center supporting plate 93, and the ribs 94B and 94B are arranged at a fixed interval from the rib 94A to a longitudinal direction. The ribs 94A and 94B protrude in a horizontal direction to the center supporting plate 93, as well as the wing plates 91 and 92. Here, in the stabilizer link 5, bottoms of a ball sheet and a housing is fixed by an ultrasonic wave caulking. In FIG. 3, the same reference numerals denote the same components as those in the stabilizer link 5 shown in FIG. 2.

The housing 80 and the support bar 90 are formed by injection molding using forming dies with cavities having corresponding shapes thereto. The cavities have a housing forming portion for forming the housing 80 and a support bar forming portion for forming the support bar 90. The support bar forming portion has a wing plate forming portion for forming the wing plates 91 and 92, a center supporting plate forming portion for forming the center supporting plate 93, and a rib forming portion for forming the ribs of 94A and 94B. In this case, a gate for injecting the resin in the cavity is located at a longitudinal and horizontal center portion of the bottom wing plate formatting portion.

In such injection molding, the broader the passage width, the larger the fluidity of the resin. In the support bar 90 of the stabilizer link 5, a plate thickness t1 of the wing plates 91 and 92 (a passage width of the wing plate forming portion) is 4.2 mm, a plate thickness t2 of the center supporting plate 93 (a passage width of the center supporting plate forming portion) is 3.2 mm, and a plate thickness t3 of the rips 94A and 94B (a passage width of the rib forming portion) is 2.2 mm. As described above, the passage widths are set to narrow in an order of the wing plate forming portion, the center plate forming portion, and the rib forming portion. Therefore, the resin in the support bar forming portion flows in an order of the wing plate forming portion, the center plate forming portion, and the rib forming portion, and it is filled in the rib forming portion after filling in the wing plate forming portion and the center plate forming portion.

Patent Document 1 is Japanese Unexamined Patent Application Publication No. Hei 6-117429.

When a longitudinal direction of the reinforcing fiber included in the resin agrees with a direction of strength required in the plates, the strength due to the reinforcing fiber can be sufficiently obtained. In the case of the wing plates 91 and 92 and the center supporting plate 93 having a function which prevents buckling of the support bar 90, the required strength direction is a longitudinal direction of the support bar, and in case of the ribs 94A and 94B having a function which prevents falling of the wing plates 91 and 92, the required strength direction is a perpendicular direction.

The strength of each portion of the support bar 90 is theoretically obtained based on a cross sectional moment, etc. However, it was proven that there was a problem in that the following failure in manufacturing occurs in the ribs 94A and 94B by researching the ribs 94A and 94B of the support bar 90 having the above structure.

When a passage width of a rib forming portion of the forming die is too narrow, flow of the resin from the bottom wing plate forming portion at a gate side to the rib forming portion is decreased by increasing a pipeline resistance in the passage, and as a result, flow of the resin from the top wing plate forming portion of at an opposite side to the gate side is increased. Therefore, since the resin from the top wing plate forming portion and the resin from the bottom wing plate forming portion are joined in a height direction center portion of the rib forming portion or the vicinity thereof, there is a problem in that defects such as weld flow, etc., occur at this junction of the resins. In this case, when turbulent flow is generated by collision, etc., at the junction of the resin, the reinforcing fiber is caught in the turbulent flow, and each reinforcing fiber is arranged in a random direction. Since it is difficult to arrange the reinforcing fiber in the required strength direction as described above, there is a problem in that strength required on the ribs 94A and 94B cannot be ensured. In particular, a perpendicular center portion of the ribs 94A and 94B is a portion in which the generation stress is the maximum, and therefore, the above problem is serious.

In addition, when the passage width of the rib forming portion in the forming die is too wide, minute voids are generated on the ribs 94A and 94B, and there is a problem in that the strength required on the ribs 94A and 94B cannot be ensured. Furthermore, it is preferable that the resin is flowed from the wing plate forming portion to the rib forming portion in the injection molding, since the required strength direction of the ribs 94A and 94B is perpendicular. However, since the resin flows in the support bar forming portion, in an order of the wing plate forming portion, the center supporting plate forming portion and the rib forming portion, and it also flows from the center supporting plate forming portion, and as a result, there is a problem in that the strength required on the ribs 94A and 94B cannot be ensured.

As described above, in particular, in the ribs 94A and 94B, there is a problem in that the required strength cannot be ensured.

Therefore, an object of the present invention is to provide a stabilizer link and a manufacturing method therefor which can ensure strength required in wing plates and a center supporting plate and in a support bar, and which can ensure strength required in ribs.

DISCLOSURE OF THE INVENTION

A stabilizer link of the present invention, formed by injection molding using reinforcing fiber containing resin, comprising a support bar for connecting two housings, in which the support bar comprises a top wing plate, a bottom wing plate, a center supporting plate, and a plurality of ribs, the top wing plate, the bottom wing plate and the center supporting plate extend to a longitudinal direction of the support bar, and have a I shape in a cross section perpendicular to the longitudinal direction, the plurality of ribs are formed, so as to separate in the longitudinal direction between the top wing plate and the bottom wing plate, and when a longitudinal orientation ratio at a longitudinal center portion of the top wing plate and the bottom wing plate is set to be D1(%), a perpendicular orientation ratio at a perpendicular center portion of the ribs is set to be D2(%), and a perpendicular orientation ratio at a perpendicular end portion of the ribs is set to be D3(%), the orientation ratios D1 to D3 satisfy Equation 1.

$$D1 > D2 > D3 \qquad \text{Equation 1}$$

The directions in the stabilizer link of the present invention are described based on the case in which the top wing plate is located at an upper side and the bottom wing plate is located at an under side. The perpendicular center portions of the ribs are perpendicular center portions of the ribs formed on both sides in a right and left direction of the center supporting plate, respectively, since the ribs are formed on both surfaces in a right and left direction of the center supporting plate which for example, are parallel to a longitudinal direction of the center supporting plate.

In the present invention, an orientation ratio of the reinforcing fiber is defined as below. In case of the wing plate and the center supporting plate, the required strength direction is a longitudinal direction of the support bar, and in case of the rib, the required strength direction is a perpendicular direction. On each portion, the reinforcing fiber is defined to arrange in a required strength direction, when an angle of the reinforcing fiber relative to the required strength direction is a range of not less than −45 degrees and not more than 45 degrees. In the following, such reinforcing fiber oriented in the required strength direction is described as a required strength direction oriented fiber.

The orientation ratio is a ratio of the number of the required strength direction oriented fiber per the number of total fiber in a fixed region of a cross section (a parallel cross section to the required strength direction) of each portion DM (=the number of the required strength direction oriented fiber/the number of total fiber).

As a method for counting the number of total fiber, a method for counting bright portions as a fiber in a cross sectional photograph observed by for example, a SEM, can be used. In this case, bright portions in for example a linear shape, an elliptical shape, a round shape, and a similar shape thereto, can be counted as a fiber. With respect to the bright portions in a linear shape or an approximate linear shape, the number N can be expressed in v/u, when a fixed length (for example, 0.1 mm) is set to be a unit length u (mm) and a measured length of the fiber is set to be v (mm). In this case, the number N can be obtained by rounding off to the first decimal place.

In counting of the number of the required strength direction oriented fiber, fiber in which an angle of the reinforcing fiber relative to the required strength direction is a range of not less than −45 degrees and not more than 45 degrees in total fiber counted as described above, is set to be a required strength direction oriented fiber, and fiber in which an aspect ratio is $2^{1/2}$ or more in such fiber is counted. The aspect ratio is a ratio of the maximum length in a longitudinal direction of the bright portions per the maximum length in a width direction of the bright portions (=the maximum length in a longitudinal direction/the maximum length in a width direction). With respect to the fiber shown in FIG. 7A, for example, in which an angle relative to the required strength direction is 45 degrees, when a cross section parallel to the required strength direction is observed, it has an elliptical shape as shown in FIG. 7B and the aspect ratio thereof is $2^{1/2}$ ($\approx 1.4$). Therefore, in the present invention, the aspect ratio is set to be $2^{1/2}$ ($\approx 1.4$).

In the stabilizer link of the present invention, since resin is used as a material of the support bar, weight can be reduced. In addition, since the resin contains the reinforcing fiber and the orientation direction of the reinforcing fiber in each plate of the support bar is set as described below, the strength in each plate can be ensured. In the top wing plate, the bottom wing plate and the center supporting plate of the support bar, the reinforcing fiber is oriented to a longitudinal direction of the support bar which is the required strength direction thereof, and in the ribs, the strength can be obtained in the required strength direction of each plate by the reinforcing fiber, since the reinforcing fiber is orientated to a perpendicular direction thereof.

Here, in the stabilizer link of the present invention, the longitudinal orientation ratio D1 of the longitudinal center portion of the wing plate, the perpendicular orientation ratio D2 of the perpendicular center portion of the rib, and the perpendicular orientation ratio D3 of the perpendicular end portion of the rib satisfy the Equation 1. Therefore, the strength in the required strength direction (a longitudinal direction) can be sufficiently obtained by the reinforcing fiber, since the longitudinal orientation ratio D1 of the longitudinal center portion is set to be the maximum in all wing plates. As a result, buckle of the support bar can be effectively prevented, when the compressive load is applied to a longitudinal direction of the support bar. In the rib, the strength in the required strength direction (a perpendicular direction) can be sufficiently obtained by the reinforcing fiber, since the perpendicular orientation ratio D2 of the perpendicular center portion is set to be higher than the perpendicular orientation ratio D3 of the perpendicular end portion. As a result, falling of the wing plate can be effectively prevented.

The stabilizer link of the present invention may have various structures. The orientation ratio can be set as described below in order to sufficiently obtain the strength in the required strength direction of each plate by the reinforcing fiber. For example, the perpendicular orientation ratio D2 of the perpendicular center portion of the rib may be set to be 50% or more. The longitudinal orientation ratio D1 of the longitudinal center portion of the top wing plate and the bottom wing plate may be set to be 60% or more. The longitudinal orientation ratio D4 of the longitudinal center portion of the center supporting plate may be set to be 60% or more.

In particular, in the wing plate and the center supporting plate, when the orientation directions of the reinforcing fiber in all portions in a longitudinal direction agree with the required strength direction, the maximal strength can be obtained by the reinforcing fiber. In the rib, when the orientation directions of the reinforcing fiber in all portions in a perpendicular direction agree with the required strength direction, the maximal strength can be obtained by the reinforcing fiber. As a result, the above effect can be more effectively obtained.

Additionally, the content of the reinforcing fiber in the resin may be 25 to 60% by weight. The resin may be an engineering plastic or a super engineering plastic.

A manufacturing method for a stabilizer link of the present invention is a method for manufacturing the stabilizer link of the present invention. That is, the manufacturing method for the stabilizer link of the present invention has a step for forming a support bar which inserts resin from a gate in a cavity of a forming die and injection molds, a step for forming a top wing plate, a bottom wing plate, and a center supporting plate which extend to a longitudinal direction of the support bar and in which a cross section perpendicular to the longitudinal direction has a I shape in forming of the support bar, and a step for forming a plurality of ribs, so as to separate in the longitudinal direction between the top wing plate and the bottom wing plate, in which when a thickness of the top wing plate and the bottom wing plate is set to be t1, a thickness of the center supporting plate is set to be t2, and a thickness of the plurality of ribs is set to be t3, the thicknesses t1 to t3 satisfy Equations 2 to 4.

$$t1 > t2 > t3 \qquad \text{Equation 2}$$

$$0.77 \leq t2/t1 \leq 0.85 \qquad \text{Equation 3}$$

$$0.77 \leq t3/t2 \leq 0.85 \qquad \text{Equation 4}$$

In the manufacturing method for the stabilizer link of the present invention, the orientation direction of the reinforcing fiber of each plate agree with the required strength direction, as the stabilizer link of the present invention, and each thickness of the top wing plate, the bottom wing plate, the center supporting plate and the rib is set, in order to control the flow of the resin, so that the longitudinal orientation ratio D1 of the longitudinal center portion of the wing plate, the perpendicular orientation ratio D2 of the perpendicular center portion of the rib, and the perpendicular orientation ratio D3 of the perpendicular end portion of the rib satisfy the Equation 1.

In the forming die used in the manufacturing for the stabilizer link, for example, when the resin is injected from the gate, the resin flows to the support bar forming portion and the housing forming portion. In this case, the resin flows in the support bar forming portion through the housing forming portion, in an order of the wing plate forming portion, the center supporting plate forming portion and the rib forming portion, so that a thickness t1 of the top wing plate and the bottom wing plate, a thickness t2 of the center supporting plate, and a thickness t3 of the plurality of ribs satisfy Equation 2. The resin is filled in the rib forming portion, after it is filled in the wing plate forming portion and the center supporting plate forming portion.

In this case, the thickness of the top wing plate and the bottom wing plate is the maximum, since the wing plates are portions which most contribute to improve the rigidity of the support bar. For example, in the case in which the gate is formed at a wing plate forming portion side in the cavity of the forming die, the orientation direction of the reinforcing fiber in the wing plate can be set to be a longitudinal direction of the support bar, since the resin flows in a longitudinal direction of the wing plate forming portion when the resin is injected from the gate in the cavity. Therefore, the strength can be sufficiently obtained by the reinforcing fiber, since the orientation direction of the reinforcing fiber agrees with the required strength direction of the wing plate.

Here, in the manufacturing method for the stabilizer link of the present invention, the wing plate and the center supporting plate having an I shape can be formed before forming the rib by setting the center supporting plate to be a thickness which is thinner than that of the wing plate and is thicker than that of the rib. In this case, when for example, the gate is formed at the bottom wing plate forming portion side in the cavity of the forming die, a primary flow (a main flow) of the resin generates in the bottom wing plate forming portion and the center supporting plate forming portion, and the resin flows from the bottom wing plate forming portion at a gate side into the rib forming portion. As a result, in the rib forming portion, the resin can flow upward in a perpendicular direction before it flows downward in a perpendicular direction.

Whereby, the resin is effectively prevented from flowing from the center supporting plate forming portion to the rib forming portion, and in the rib, generation of defects such as weld flow is prevented in the perpendicular center portion and the vicinity thereof in which the maximal stress generates. As a result, the orientation direction of the reinforcing fiber can be set to be a perpendicular direction. Therefore, the orientation direction of the reinforcing fiber can agree with the required strength direction of the rib, and the strength can be sufficiently obtained by the reinforcing fiber. In addition, the generation of the minute voids in the injection molding can be prevented by properly setting the thicknesses t1 to t3, so as to satisfy the Equations 2 to 4.

In each of the wing plate, the center supporting plate and the rib, as described above, the agreement of the orientation direction of the reinforcing fiber with the required strength direction and the setting of the orientation direction ratios D1 to D3 which satisfies the Equation 1 can be effectively realized by satisfying the Equations 2 to 4.

The manufacturing method for the stabilizer link of the present invention may have various compositions in order to improve various characteristics. For example, the thicknesses t1 to t3 may be set to be 2.0 mm or more. For example, in a cross section in a longitudinal direction of the support bar, an aspect ratio (=a lateral length/a vertical length) of a quadrilateral shape formed by the center portions of the top wing plate and the bottom wing plate and two ribs connected therewith may be set to be a range of 0.8 to 1.2.

For example, the thickness t1 may be set to be a range of 3.0 to 4.0 mm. For example, in the cross section in a longitudinal direction of the support bar, an aspect ratio (=a lateral length/a vertical length) of a quadrilateral shape formed by the end portions of the top wing plate and the bottom wing plate and two ribs connected therewith may be set to be 0.6 or more. For example, the minimal curvature radius of bent portion formed at a boundary portion of each plate of the support bar may be set to be a range of 0.5 to 1.0.

According to the stabilizer link of the present invention or the manufacturing method therefor, the required strength of the wing plate and the center supporting plate in the support bar can be ensured, the resin can be effectively prevented from flowing from the center supporting plate forming portion to the rib forming portion in a forming die, and generation of defects such as weld flow, minute voids, etc., can be prevented. Therefore, the required strength of the rib can be ensured.

EXPLANATION OF REFERENCE NUMERALS

Figure 1:
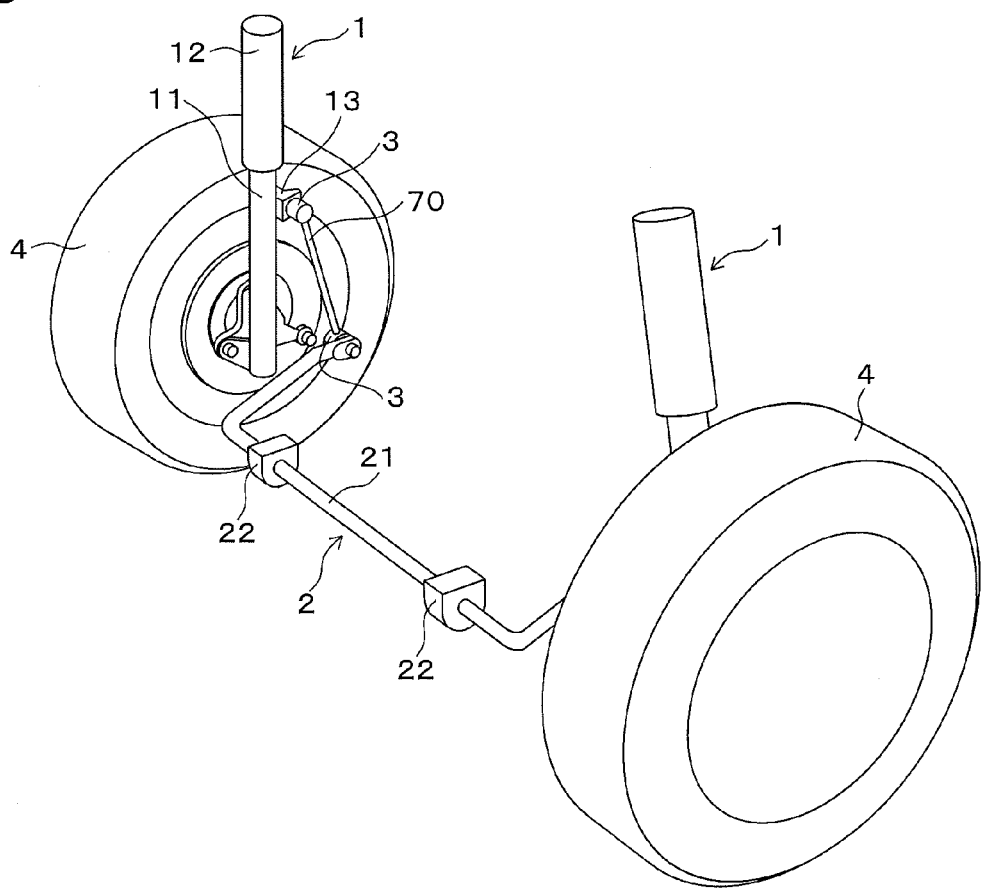
FIG. 1 is a perspective view showing a schematic structure of a front side wheel of vehicle.

Reference numeral 100 denotes a stabilizer link, 110 denotes a ball stud, 111 denotes a stud portion, 112 denotes a ball portion, 120 denotes a ball seat, 130 denotes a housing, 131 denotes a ball seat receiving portion, 132 denotes an upper end portion, 140 denotes a dust cover, 150 denotes a support bar, 151 denotes a top wing plate, 152 denotes a bottom wing plate, 153 denotes a center supporting plate, 154A to 154F denote ribs, G1 denotes a position corresponding to a gate, t1 denotes a thickness of the wing plate, t2 denotes a thickness of the center supporting plate, and t3 denotes a thickness of the rib.

MODE FOR CARRYING OUT THE INVENTION

1. Structure and Manufacturing Method of Stabilizer Link

Figure 2:
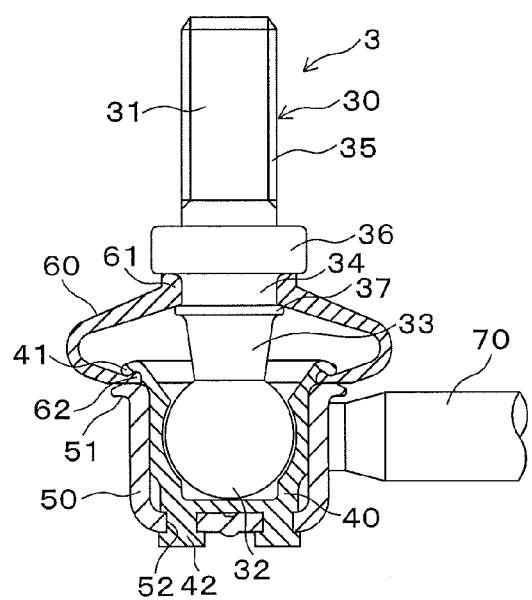
FIG. 2 is a side cross sectional view showing a schematic structure of a conventional stabilizer link.
Figure 4:
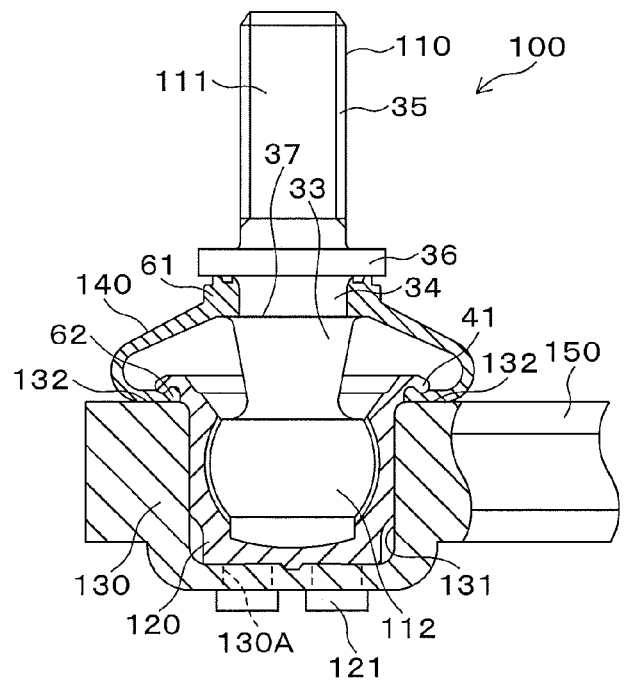
FIG. 4 is a side cross sectional view showing a schematic structure of a left portion of a stabilizer link according to an embodiment of the present invention.

In the following, an embodiment of the present invention will be explained with reference to the Figures. FIG. 4 is a view showing a schematic structure of a left portion of a stabilizer link according to an embodiment of the present invention, and FIG. 5 is views showing a schematic structure of a housing and a support bar integrally formed in a stabilizer link according to an embodiment of the present invention. With respect to the stabilizer link 100 in present embodiments, the similar members to those of the stabilizer link 3 shown in FIG. 2 are represented by the same reference numerals, and the explanations thereof are omitted.

The stabilizer link 100 has a ball stud 110, a ball seat 120, a housing 130 and a dust cover as shown in FIG. 4. The housings of the stabilizer link 100 are connected by a support bar 140.

The ball stud 110 has a stud portion 111 and a ball portion 112 made of metal and integrally molded, for example. The stud portion 111 has a taper portion 33, a straight portion 34, a screw portion 35, a flange 36 and a convex portion 37, for example. The ball seat 120 is made of resin such as POM (polyacetal), for example, and receives the ball portion 112 of the ball stud 110. The ball seat 120 has a flange portion 41 and a heat caulking portion 121, for example.

The housing 130 has a ball seat receiving portion 131 for receiving the ball seat 120. The housing 130 has an upper end portion 132 in which an upper surface is flat, for example, at a side surface thereof. Holes 130A are formed on the bottom of the housing 130. The heat caulking portions 121 of the ball seat 120 are protruded through the holes 130A on the bottom of the housing 130, and tips thereof are engaged with an underside of the housing 130. A dust cover 140 has fixing portions 61 and 62.

The support bar 150 is a bar integrally molded with the housing 130, as shown in FIG. 5 for example, and it has a top wing plate 151, a bottom wing plate 152, a center supporting plate 153 and ribs 154A to 154F. In the following, a structure and a manufacturing method of the support bar 150 will be explained in detail.

For example, such stabilizer link 100 is manufactured by the following manufacturing method. First, for example, an upper fixing portion 61 of the dust cover 140 is abutted and is held between the flange 36 and the convex portion 37 of the stud ball 201. Next, the ball portion 112 of the stud ball 110 is press-fitted in the ball seat 120. In this case, the underside fixing portion 62 of the dust cover 140 is arranged at an underside of the flange 41 of the ball seat 120. Here, the ball seat 120 has a pin portion for forming the heat caulking portion 121 in the below process.

Then, the housing 130 and the support bar 150 which are integrally molded are prepared, and the ball seat 120 is press-fitted in the ball seat receiving portion 131 of the housing 130. In this case, the underside fixing portion 62 of the dust cover 140 is sandwiched between the flange 41 of the ball seat 120 and the upper end portion 132 of the housing 130, and the pin portion of the ball seat 120 is formed in a shape which protrudes outwardly from the hole 130A of the housing 130. Next, using a heat caulking machine, the pin portion of the ball seat 120 is transformed by heating, and the heat caulking portion 121 is formed. Thus, the stabilizer link 100 shown in FIG. 4 is manufactured by fixing the ball seat 120 in the housing 130.

2. Structure and Manufacturing Method of Support Bar

The wing plates 151 and 152 and the center supporting plate 153 extend to a longitudinal direction of the support bar 150, as shown in FIG. 5, for example, and they form an I shape in a cross section perpendicular to a longitudinal direction. The center supporting plate 153 has a function which supports the wing plates on all portions in a longitudinal direction (a parallel direction to an x direction) of the support bar 150. The ribs 154A to 154F arranged on right and left surfaces in a longitudinal direction of the center supporting plate 153 are formed between the wing plates 151 and 152, so as to separate in a longitudinal direction. In this case, the ribs 154A to 154F protrude from the center supporting plate 153 to a width direction (a parallel direction to a y direction), as well as the wing plates 151 and 152, for example, and they have a function which prevent falling of the wing plates 151 and 152.

The support bar 150 is integrally molded with the housing 130, for example, and is made of reinforcing fiber containing resin. As a material of the resin, engineering plastics or super engineering plastics are preferable in order to attempt strength securement, weight decreasing and weatherproof improvement. As an engineering plastic, for example, PA66 (nylon 66), PA6 (nylon 6), PPS (polyphenylene sulfide) and POM (polyacetal) can be used. As a reinforcing fiber, for example, fine grass fiber can be used.

It is suitable that content of the reinforcing fiber in the resin be 25 to 60 weight %. It is suitable that the above content be 25 weight % or more, in order to set to be a strength improvement effect by reinforcing fiber and strength at a high temperature (for example, 80 degree Celsius) to 50% or more of those at an ordinary-temperature (for example, 23 degree Celsius). In contrast, when the above content of the reinforcing fiber is increased, it is suitable to set the above content be 60 weight % or less, since life of an injection molding machine used in the molding is decreased.

In the top wing plate 151, the bottom wing plate 152 and the center supporting plate 153, an orientation direction of the reinforcing fiber is set to be a longitudinal direction of the support bar 150, and the reinforcing fiber is arranged in a longitudinal direction of the support bar 150. In the ribs 154A to 154F, an orientation direction of the reinforcing fiber is set to be a perpendicular direction (a parallel direction to a z direction). In this case, when a longitudinal orientation ratio at a longitudinal center portion of the top wing plate 151 and the bottom wing plate 152 is set to be D1(%), a perpendicular orientation ratio at a perpendicular center portion of the ribs 154A to 154F is set to be D2(%), and a perpendicular orientation ratio at a perpendicular end portion of the ribs 154A to 154F is set to be D3(%), the orientation ratios D1 to D3 satisfy Equation 1.

$$D1 > D2 > D3 \qquad \text{Equation 1}$$

It is preferable that the longitudinal orientation ratio D1 at a longitudinal center portion of the top wing plate 151 and the bottom wing plate 152 be set to be 60% or more. It is preferable that a longitudinal orientation ratio D4 at a longitudinal center portion of the center supporting plate 153 be set to be 60% or more. It is preferable that the perpendicular orientation ratio D2 at a perpendicular center portion of the ribs 154A to 154F be set to be 50% or more.

Figure 5A:
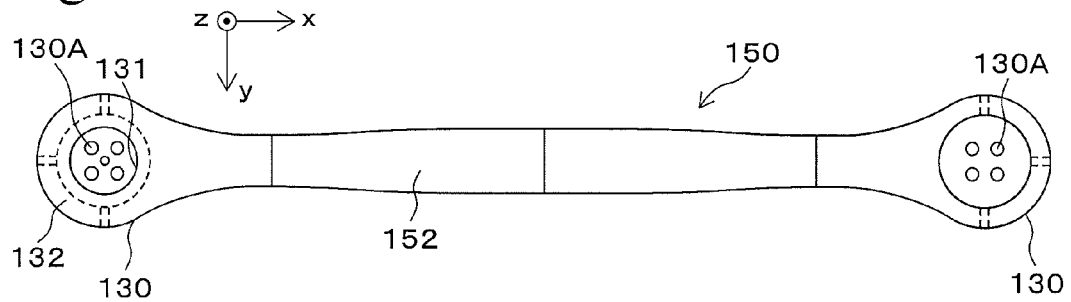
FIG. 5A is a top view showing a schematic structure of a housing and a support bar integrally formed in a stabilizer link according to an embodiment of the present invention.
Figure 5B:
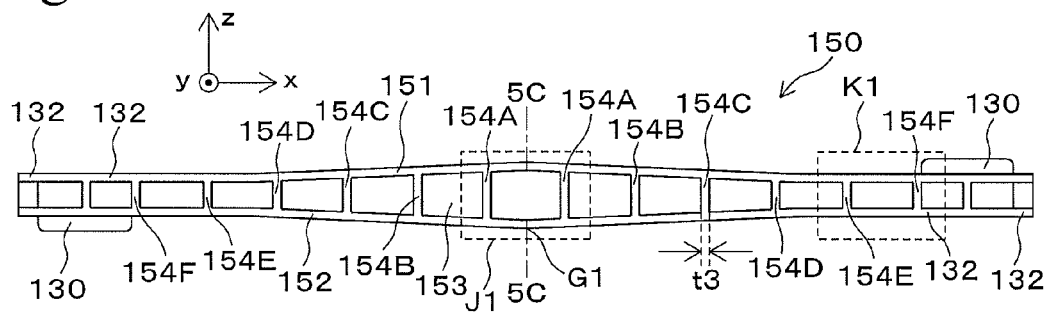
FIG. 5B is a side view thereof.
Figure 5C:
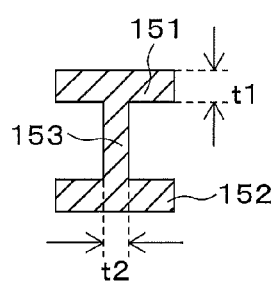
FIG. 5C is a side cross sectional view showing a cross section cut by a 5C-5C line in FIG. 5B.
Figure 5D:
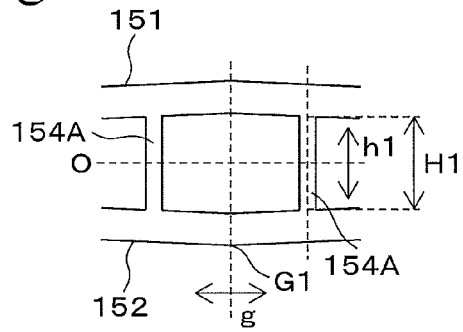
FIG. 5D is an enlarged view showing a structure in an area surrounded by a frame J1 in FIG. 5B.

In this case, for example, in each of the ribs 154A to 154F (only the rib 154A is shown in FIG. 5D), it is preferable that an area in which the perpendicular orientation ratio is 50% or more be formed and a ratio of a perpendicular length of the area h1 per a perpendicular total length H1 (a rib height) be set to be 60% or more. In this case, it is preferable that a boundary portion be formed between the above area in which many reinforcing fibers are orientated in a perpendicular direction and the center supporting plate 152 in which many reinforcing fibers are orientated in a longitudinal direction. Here, the perpendicular center portion of the length h1 is located at the perpendicular center portion of each rib. In FIG. 5D, a height of the rib at a thickness center is shown as an example of the total length H1.

The housing 130 and the support bar 150 are manufactured by injection molding using a forming die having a cavity in a corresponding shape to them. In the forming die, the below forming portions of each part are formed in the cavity by using an inserting die, etc. The cavity has a housing forming portion for forming the housing 130 and a support bar forming portion for forming the support bar 150. The support bar forming portion has a wing plate forming portion for forming the wing plates 151 and 152, a center supporting plate forming portion for forming the center supporting plate 153, and a rib forming portion for forming the ribs 154A to 154F.

In order to realize the above orientation of the reinforcing fiber in the wing plates 151 and 152, the center supporting plate 153 and the ribs 154A to 154F, it is necessary that a thickness t1 of the wing plates 151 and 152 (FIG. 5C, corresponding to the passage width of the wing plate forming portion), a thickness t2 of the center supporting plate 153 (FIG. 5C, corresponding to the passage width of the center supporting plate forming portion), and a thickness t3 of the ribs 154A to 154F (FIG. 5B, corresponding to the passage width of the rib forming portion) satisfy Equations 2 to 4.

$$t1 > t2 > t3 \quad \text{Equation 2}$$

$$0.77 \leq t2/t1 \leq 0.85 \quad \text{Equation 3}$$

$$0.77 \leq t3/t2 \leq 0.85 \quad \text{Equation 4}$$

For example, a gate for injecting the resin in the cavity (a position corresponding to a reference character G1 in FIGS. 5B and 5D) is set at the center in a longitudinal direction (a parallel direction to an x direction) and a width direction (a parallel direction to a y direction) of a bottom wing plate forming portion. Here, the gate (FIG. 5D) is not limited to the above setting at the center in a longitudinal direction and a width direction, and for example, it may be set in a given range denoted by a reference character g on the wing plate forming portion. For example, the center of reference character g is located to the longitudinal center portion of the bottom wing plate forming portion.

In the present embodiment, for example, when the resin is injected from the gate to the cavity of the forming die, the resin flows into the support bar forming portion and the housing forming portion. In this case, the flow of the resin in the support bar forming portion through the housing forming portion occurs from the wing plate forming portion, the center supporting plate forming portion, and the rib forming portion in this order, so that the thickness t1 of the top wing plate and the bottom wing plate, the thickness t2 of the center supporting plate, and the thickness t3 of the plurality of ribs satisfy the Equation 2. Then, the resin is filled in the rib forming portion after filling in the wing plate forming portion and the center supporting plate forming portion.

In this case, in the wing plate forming portion and the center supporting plate forming portion of the support bar forming portion, a primary flow (a main flow) of the resin generates, and the wing plates 151 and 152 and the center supporting plate 153 which form an I-shape are formed before forming of the ribs 154A to 154F. In this case, since the flow of the resin generates in a longitudinal direction in the wing plate forming portion and the center supporting plate in the cavity, an orientation direction of the reinforcing fiber is set to a longitudinal direction of the support bar in the wing plates 151 and 152 and the center supporting plate 153. Therefore, the orientation direction of the reinforcing fiber agrees with a required strength direction of the wing plates 151 and 152, and as a result, the strength by the reinforcing fiber can be sufficiently obtained.

Here, in the bottom wing plate forming portion and the center supporting plate forming portion, the resin flows from the bottom wing plate forming portion arranged at a gate side into the rib forming portion, when the primary flow (the main flow) of the resin generates. In this way, in the rib forming portion, the flow of the resin upward in a perpendicular direction generates prior to the flow of the resin downward in a perpendicular direction. Thus, the resin can be effectively prevented from flowing from the center supporting plate forming portion to the rib forming portion, and the orientation direction of the reinforcing fiber can be set to a perpendicular direction, since generation of defects such as a weld flow can be prevented at the center in a perpendicular direction of the rib and the vicinity thereof in which generated stress is the maximum. Therefore, the strength by the reinforcing fiber can be sufficiently obtained, since the orientation direction of the reinforcing fiber agrees with the required strength direction of the rib. In addition, generation of minute voids in the injection molding can be prevented by suitably setting the thicknesses t1 to t3 so as to satisfy the Equations 2 to 4.

As described above, in each of the wing plates 151 and 152, the center supporting plate 153 and the ribs 154A to 154F, the agreement of the orientation direction of the reinforcing fiber with the required strength direction and the setting of the orientation ratios D1 to D3 which satisfy the Equation 1 can be effectively realize by satisfying the Equations 2 to 4.

In particular, when the perpendicular orientation ratio D2 at the perpendicular center portion of the ribs 154A to 154F is set to 50% or more, the strength by the reinforcing fiber can be further obtained in the ribs 154A to 154F. When the longitudinal orientation ratio D1 of the longitudinal center portion of the top wing plate 151 and the bottom wing plate 152 is set to be 60% or more, the strength by the reinforcing fiber can be further obtained in the wing plates 151 and 152. When the longitudinal orientation ratio D4 of the longitudinal center portion of the center supporting plate 153 is set to be 60% or more, the strength by the reinforcing fiber can be further obtained in the center supporting plate 153.

In the above injection molding, it is preferable to satisfy the following conditions, in order to improve performance of the support bar 150. In addition, it is preferable that the thicknesses t1 to t3 are set to be 2.0 mm or more, in order to ensure formability (fluidity of the resin) of the support bar 150.

It is preferable that intervals of the ribs 154A to 154F are set as described below.

Figure 3A:
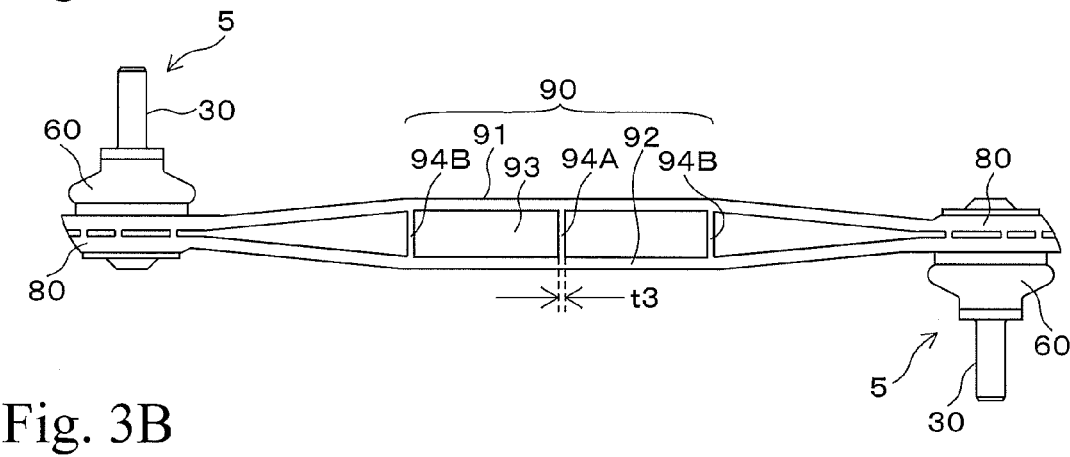
FIG. 3A is a side view showing a schematic structure of another conventional stabilizer link.
Figure 3B:
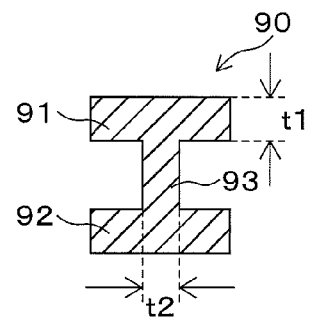
FIG. 3B is a side cross sectional view in a perpendicular direction of the figure thereof.

In the conventional stabilizer link 5 shown in FIG. 3, when an interval of the ribs 94A and 94B is extremely wider than an interval of the wing plates 91 and 92 in a quadrilateral shape surrounded by a thickness center line of the top wing plate 91 and the bottom wing plate 92 and a thickness center line of the ribs 94A and 94B, there is a problem in that the wing plates 91 and 92 fall (distort) so that the vicinity of the longitudinal center portion is the center. For example, in the stabilizer link 5, when a vertical interval of the wing plates 91 and 92 is denoted by a reference character l1 and a lateral interval of the ribs 94A and 94B is denoted by a reference character l2, there is a problem in that the wing plates 91 and 92 fall between the ribs 94A and 94B since a ratio of the intervals (=the lateral interval l2/the vertical interval l1) is about 2.5.

In contrast, in the present embodiment, the ribs 154A to 154F is formed between the wing plates 151 and 152, so that the ribs are separated in a longitudinal direction at even intervals. In this case, it is preferable that the ribs 154A to 154F be the below aspects.

Figure 6A:
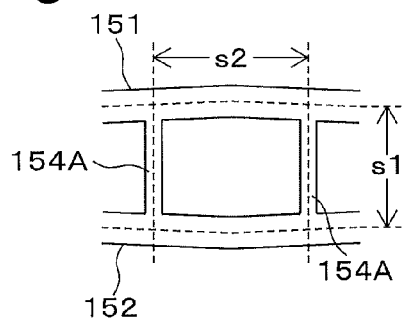
FIGS. 6A and 6B are enlarged views showing structures in areas surrounded by frames J1 and K1 in FIG. 5B.

For example, as shown in FIG. 6A, when in a longitudinal cross section of the support bar 150, a quadrilateral shape is formed by the centers of the wing plates 151 and 152 and two ribs 154A and 154A connected with those centers, it is preferable that an aspect ratio (=a lateral length s2/a vertical length s1) of the quadrilateral shape be set to be in a range of 0.8 to 1.2. Here, broken lines shown in FIG. 6A denote thickness center lines of the plates, the length s1 denotes an interval between intersection points of a thickness center line of the rib 154A and a thickness center line of the wing plate 151 or 152, and the length s2 denotes an interval between thickness center lines of the ribs 154A and 154A.

In the above quadrilateral shape, it is more difficult to fall the wing plates 151 and 152, as the aspect ratio closes to 1.0. In the support bar 150, for example, a position in which stress is highest when a buckle load is applied, is the center, and therefore, the aspect ratio of the quadrilateral shape at the position is important. On the other hand, a structure of the forming die is complicated when the interval between the ribs 154A and 154A is too short. The above range of the aspect ratio is preferable in order to avoid the failure.

Figure 6B:
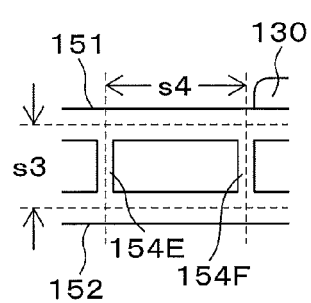
Figure 7A:
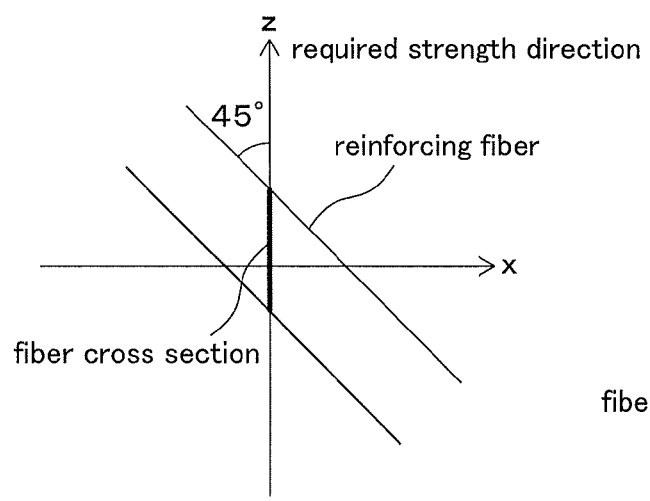
FIG. 7A is a cross sectional view showing reinforcing fiber at 45 degrees against a required strength direction, for explaining definition of an orientation ratio of a stabilizer link according to the present invention.
Figure 7B:
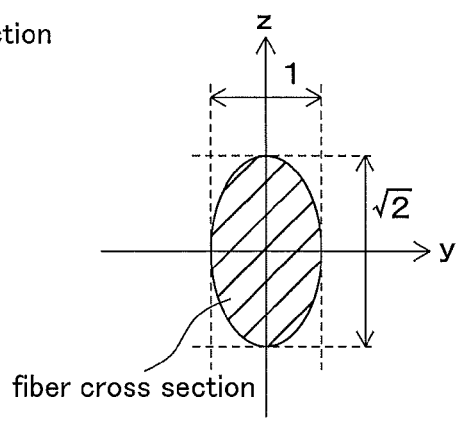
FIG. 7B is a cross sectional view in an elliptic shape showing the reinforcing fiber in the required strength direction of FIG. 7A.

Since the buckling stress is low at an end portion side of the support bar 150, the interval between the ribs may be set to be long. In this case, for example, in the longitudinal cross section of the support bar shown in FIG. 6B, when a quadrilateral shape is formed by end portions of the wing plates 151 and 152 and two ribs 154E and 154F connected with those end portions, it is preferable that an aspect ratio (=a lateral length s4/a vertical length s3) of the quadrilateral shape be set to be 0.6 or more. Here, broken lines in FIG. 6B are thickness center lines of the plates, and the length s3 denotes an interval between intersection points of a thickness center line of the rib 154E or 154F and a thickness center line of the wing plate 151 or 152, and a length s4 denotes an interval between thickness center lines of the ribs 154E and 154F.

It is preferable that a thickness t1 of the wing plates 151 and 152 be set to be a range of 3.0 to 4.0 mm. When the thickness t1 of the wing plates 151 and 152 is too thick, the minute void, etc., generates in the injection molding, and as a result, there is a problem in that an exhibitable original strength of the reinforcing fiber cannot be obtained, and it is difficult to sufficiently reduce weight. It is preferable that the thickness t1 be set to be 4.0 mm or less in order to solve such failure. Furthermore, it is preferable that the thickness t1 be set to be 3.0 mm or less in order to more effectively ensure formability (resin fluidity).

It is preferable that a curvature radius of a portion having the minimum curvature radius in a bent portion formed at a boundary portion of the support bar 150 with the plates be set to be a range of 0.5 to 1.0. In this aspect, the reinforcing fiber can be arranged in the required strength direction in each plate, since the resin is smoothly flown.

EXAMPLES

Figure 8A:
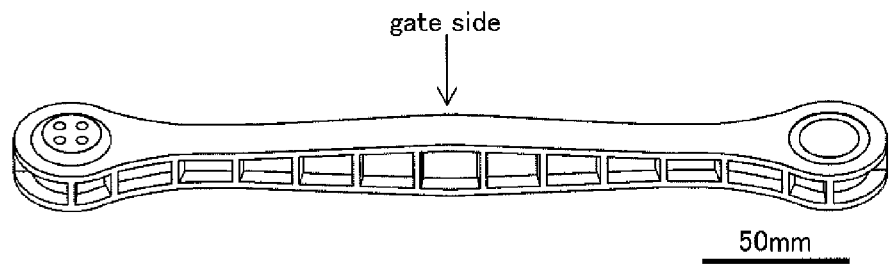
FIG. 8A is a perspective photograph (upper side) and a side photograph (lower side) showing a stabilizer link according to an example of the present invention.
Figure 8A:
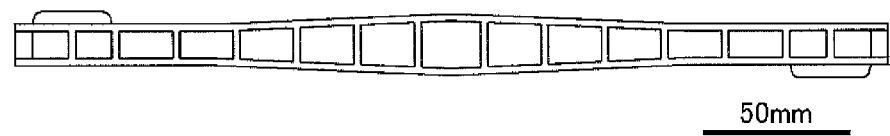

In the following, an embodiment of the present invention will be further explained with reference to specific Examples. In Examples, a stabilize link shown in FIG. 8A was manufactured by using a manufacturing method according to an embodiment of the present invention. In the manufacturing for the stabilizer link, nylon 6 or nylon 66 was used as a resin, and fine grass fiber was used as a reinforcing fiber contained in the resin. The content of the reinforcing fiber in the resin was set to be 30 to 60 weight %.

Figure 8B:
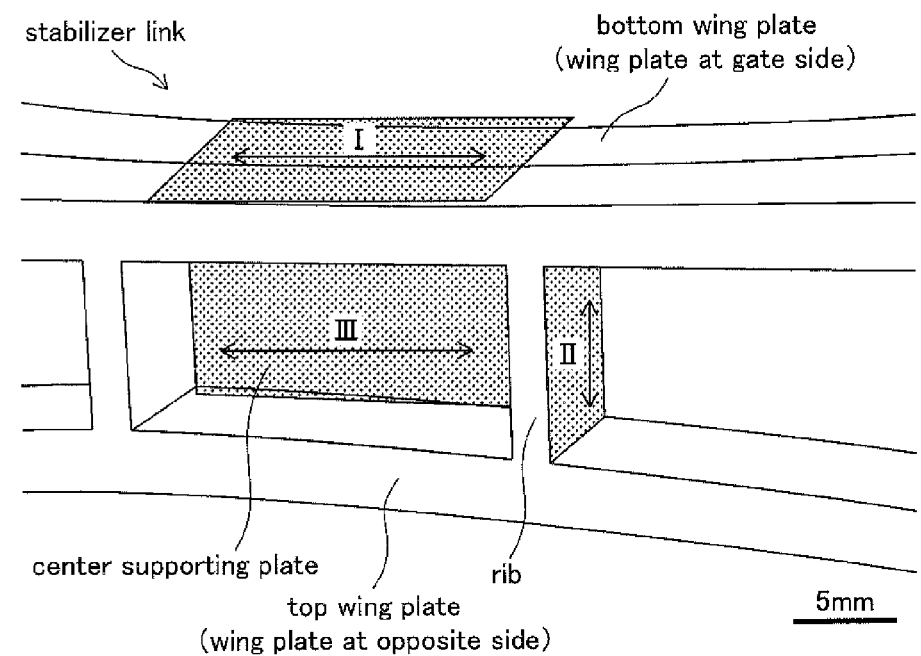
FIG. 8B is an enlarged photograph for explaining observing portions.

With respect to the stabilizer links manufactured by the above process, cross sections of a longitudinal portion (a I portion) of the bottom wing plate (a wing plate at a gate side) in the longitudinal center portion of the support bar, a perpendicular portion of a II portion of the rib (corresponding to a reference numeral 154A in FIG. 5B) and a portion in the vicinity thereof, and a longitudinal portion (a III portion) of the center supporting plate, as shown in FIG. 8B, were observed by using a SEM. The results are shown in FIGS. 9 to 15.

Here, in the wing plates shown in FIGS. 9 to 15, a gate side is located upwardly and an opposite side of the gate side is located downwardly, and therefore, in the following, a vertical structure of the wing plates turns upside down. A lateral direction corresponds to the longitudinal direction of the support bar, a vertical direction corresponds to the perpendicular direction of the support bar, and bright portions in photographs denote the reinforcing fiber. In the following, an orientation ratio of the reinforcing fiber on a given portion of each plate was shown, and as a measuring method, the method described above was used. In this case, an orientation ratio on 0.25 mm$^2$ (an area of 0.5 mm×0.5 mm) of a center portion of each photograph was measured. FIG. 16 is a graph showing the relationship between an orientation ratio and strength of reinforcing fiber containing resin, and when the orientation ratio is 100%, an angle for a required strength direction on all reinforcing fibers is not less than −45 degrees and not more than 45 degrees.

Figure 9:
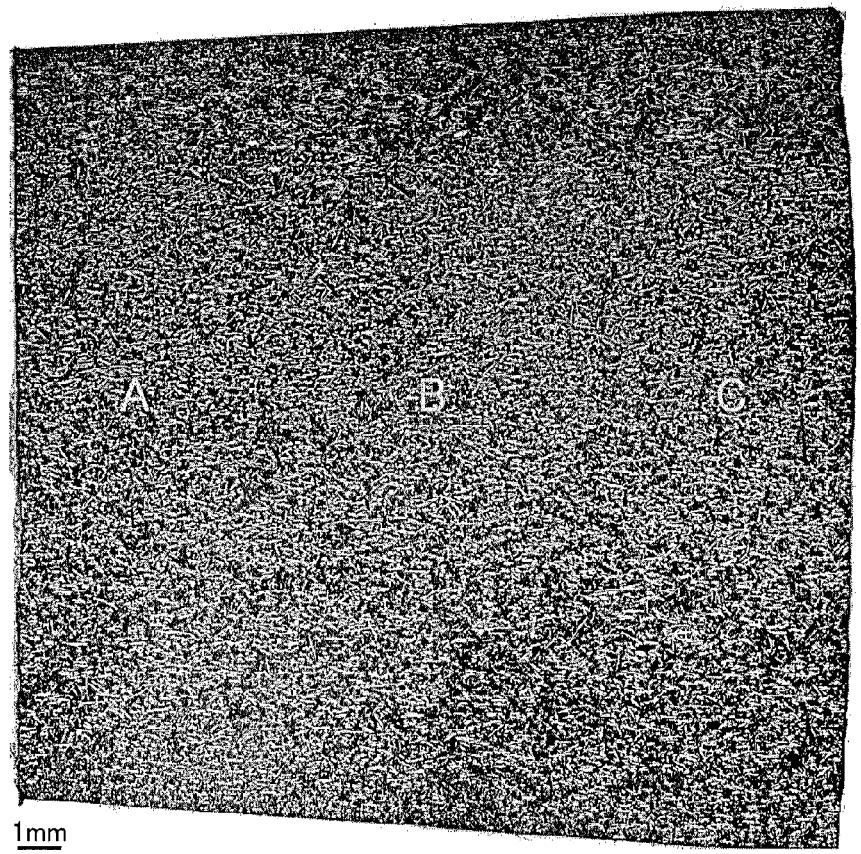
FIG. 9 is a cross sectional photograph showing a center portion (I portion) of the bottom wing plate (a gate side wing plate) shown in FIG. 8B.
Figure 10A:
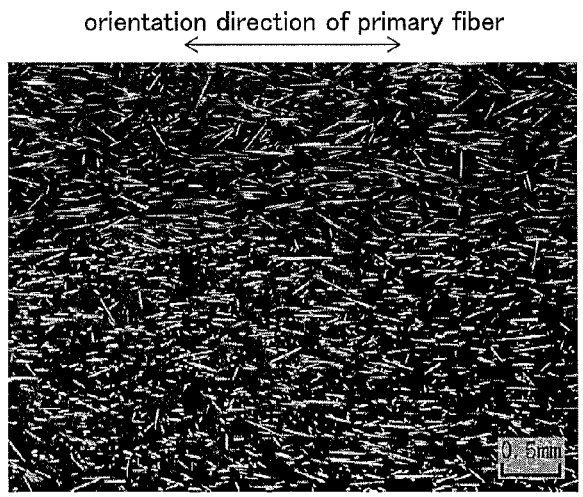
FIG. 10A is an enlarged cross sectional photograph showing an A portion (a left side of a center portion) of a center portion (I portion) of the bottom wing plate shown in FIG. 9.
Figure 10B:
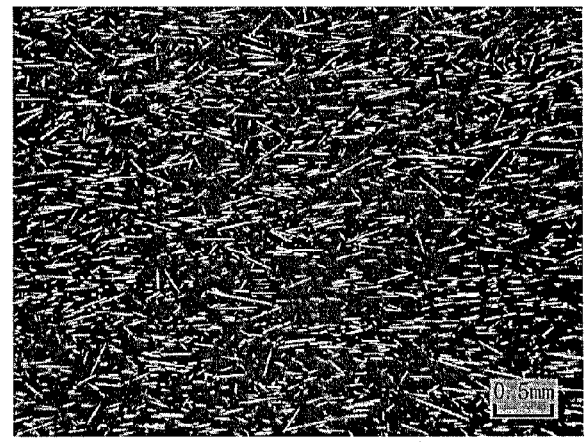
FIG. 10B is an enlarged cross sectional photograph showing a B portion (the center of a center portion) thereof.
Figure 10C:
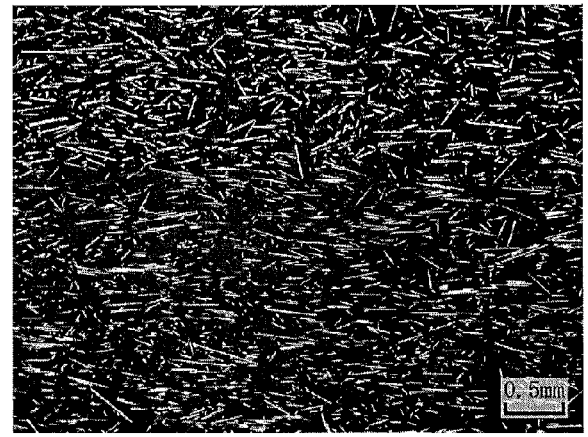
FIG. 10C is an enlarged cross sectional photograph showing a C portion (a right side of a center portion) thereof.

FIG. 9 shows a result in which a cross section of the I portion (FIG. 8B) of the bottom wing plate was observed, and FIGS. 10A to 10C show results in which enlarged cross sections of an A portion to a C portion in FIG. 9 were observed. As is apparent from FIGS. 10A to 10C, an orientation direction of the primary reinforcing fiber in the I portion of the bottom wing plate was a lateral direction (a longitudinal direction). The longitudinal orientation ratio (D1) on the B portion (a center portion) of the I portion of the bottom wing plate shown in FIG. 10B was 69.2%, and the strength thereon was 92.3%.

Figure 11:
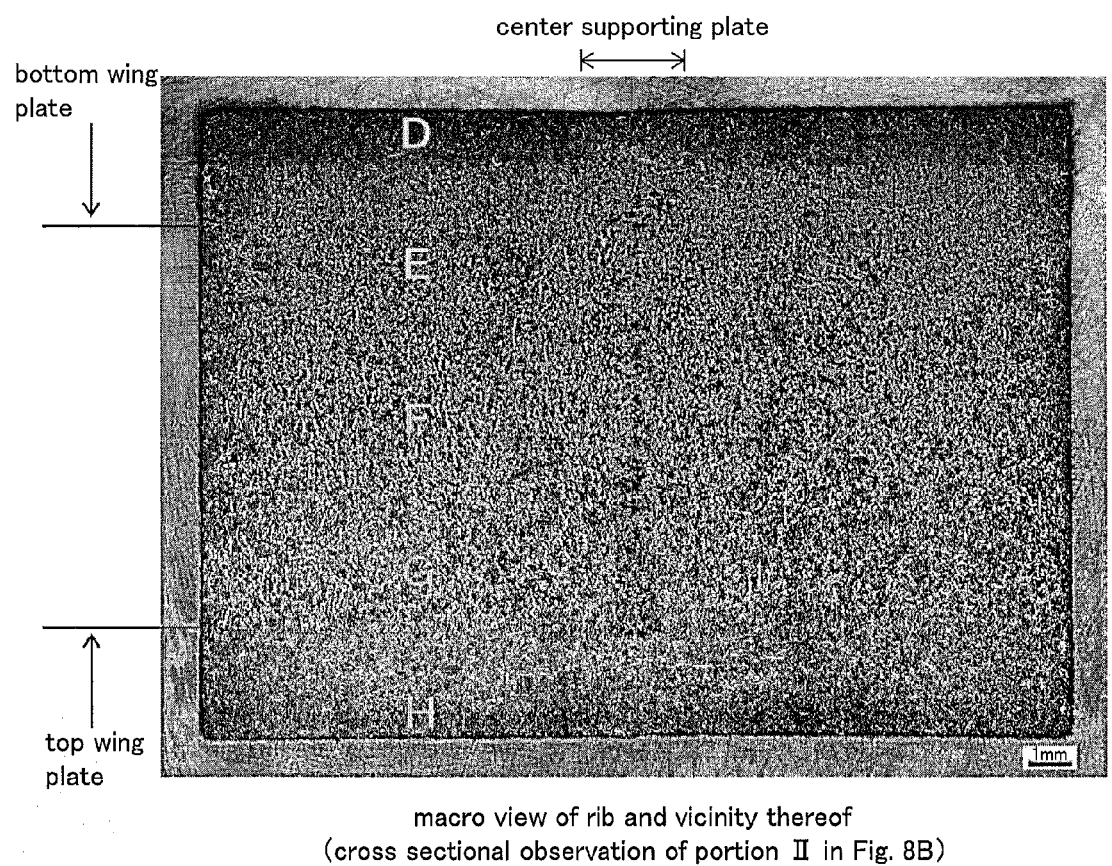
FIG. 11 is a cross sectional photograph showing a II portion and the vicinity of the rib shown in FIG. 8B.
Figure 12A:
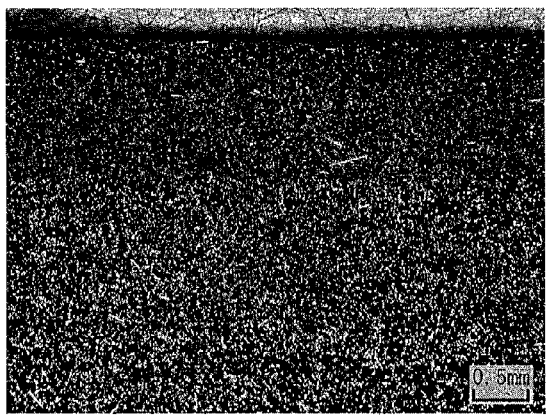
FIG. 12A is an enlarged cross sectional photograph showing a D portion (a rib side of the bottom wing plate) of the II portion of the rib shown in FIG. 11.
Figure 12B:
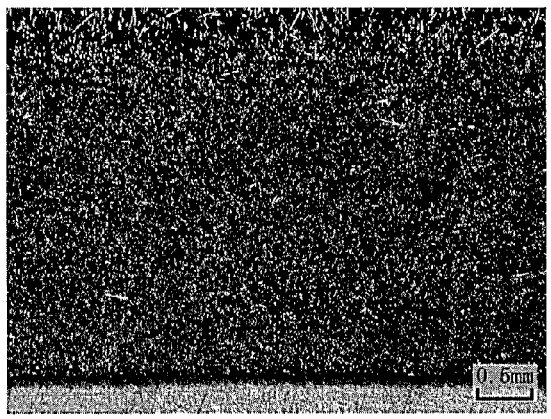
FIG. 12B is an enlarged cross sectional photograph showing an H portion (a rib side of the top wing plate) thereof.

FIG. 11 shows a result in which a cross section on the II portion of the rib and the vicinity portion (FIG. 8B) were observed, and FIGS. 12A to 13C show results in which enlarged cross sections of the D portion, the H portion and the E portion to the G portion shown in FIG. 11 were observed. The D portion shown in FIG. 11 was a rib side portion of the bottom wing plate, and the H portion shown in FIG. 11 was a rib side portion of the top wing plate, and the E portion to the G portion shown in FIG. 11 were a bottom wing plate side end portion (a gate side edge) of the rib, a perpendicular center portion of the rib, and a top wing plate side end portion (an opposite side edge) of the rib. The orientation direction of the reinforcing fiber in the D portion (a rib side portion) of the bottom wing plate and the H portion (a rib side portion) of the top wing plate is not a vertical direction (a perpendicular direction). In contrast, as is apparent from FIGS. 13A to 13C, the orientation direction of the primary reinforcing fiber in the bottom wing plate side portion (the E portion) of the rib, the F portion (a perpendicular center portion) of the rib and the G portion (the top wing plate side edge) of the rib, was a vertical direction (a perpendicular direction). In particular, in the E portion (the bottom wing plate side edge) of the rib and the G portion (the top wing plate side edge) of the rib, the tendency in which the reinforcing fiber was orientated in a vertical direction (a perpendicular direction) was increased, as they close to the F portion (a perpendicular center portion) of the rib.

Figure 13A:
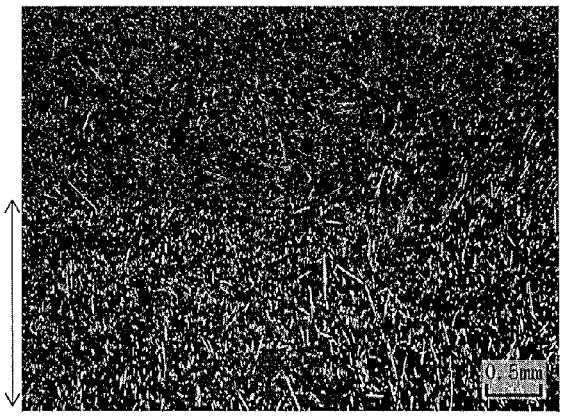
FIG. 13A is an enlarged cross sectional photograph showing an E portion (a gate side edge) of the II portion of the rib shown in FIG. 11.
Figure 13B:
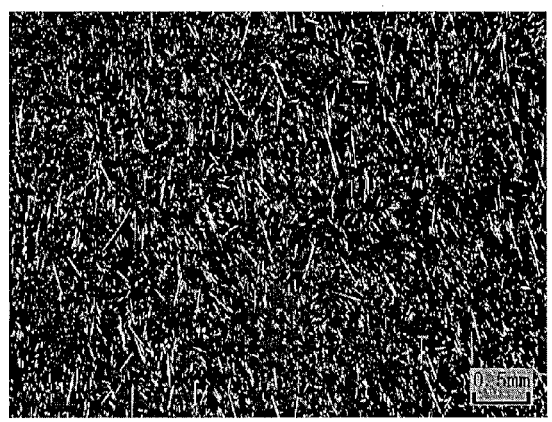
FIG. 13B is an enlarged cross sectional photograph showing an F portion (the center) thereof.
Figure 13C:
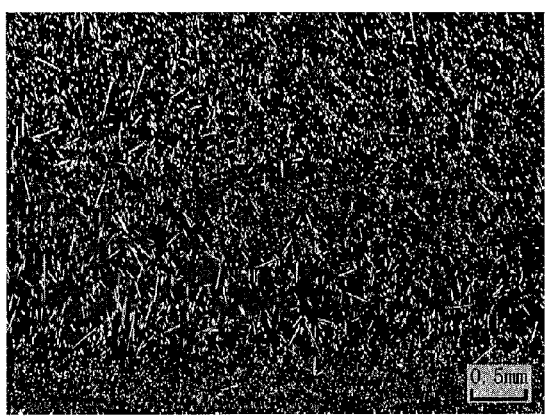
FIG. 13C is an enlarged cross sectional photograph showing a G portion (an opposite side edge) thereof.

The perpendicular orientation ratio (D2) of the perpendicular center portion (the F portion) of the rib shown in FIG. 13B was 55%, and the strength thereof was 88.8%. The perpendicular orientation ratio (D3) of the bottom wing plate side end portion (the E portion) of the rib shown in FIG. 13A was 16%, and the strength thereof was 78.8%. The perpendicular orientation ratio of the rib side portion (the D division) of the bottom wing plate shown in FIG. 12A was 6%, and the strength thereof was 76.6%.

Figure 14:
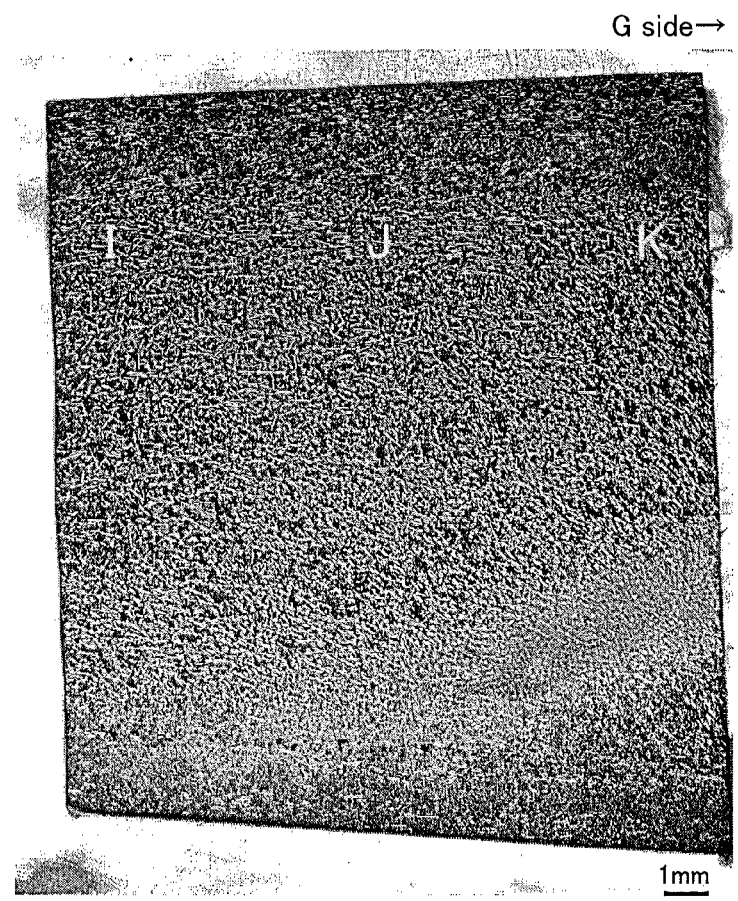
FIG. 14 is a cross sectional photograph showing a center portion (III portion) of the center supporting plate shown in FIG. 8B.
Figure 15A:
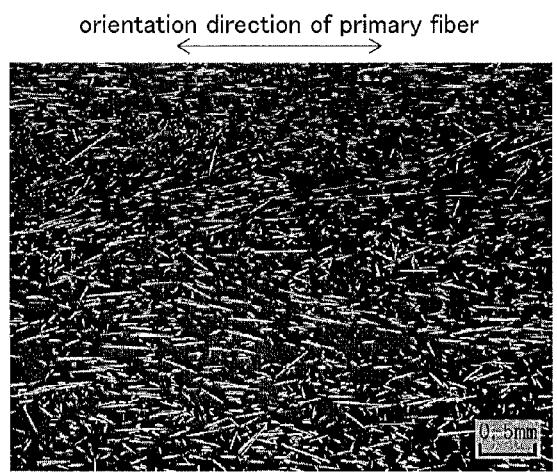
FIG. 15A is an enlarged cross sectional photograph showing an I portion (a left side of the center portion) in a center portion (III portion) of the center supporting plate shown in FIG. 14.
Figure 15B:
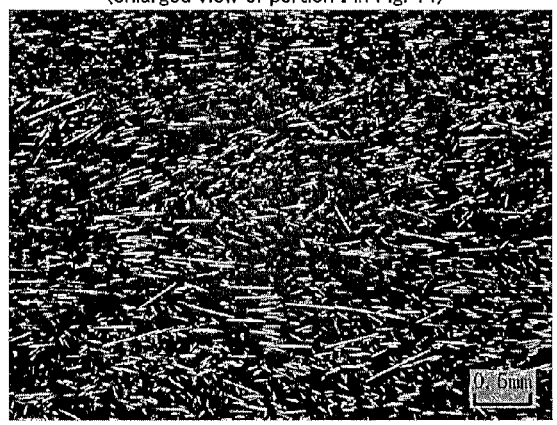
FIG. 15B is an enlarged cross sectional photograph showing a J portion (the center of a center portion) therein.
Figure 15C:
FIG. 15C is an enlarged cross sectional photograph showing a K portion (a right side of a center portion) therein.
Figure 16:
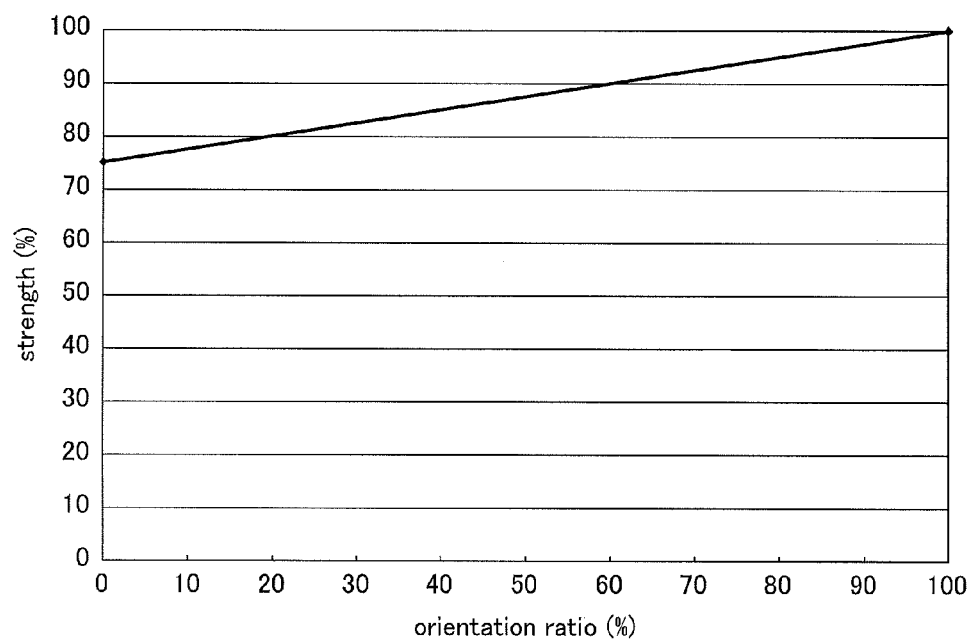
FIG. 16 is a graph showing the relationship between an orientation ratio and strength of a reinforcing fiber containing resin in a stabilizer link according to an example of the present invention.

FIG. 14 shows a result in which a cross section of the III portion (FIG. 8B) of the center supporting plate was observed, and FIGS. 15A to 15C show results in which enlarged cross sections of the I portion to the K portion shown in FIG. 14 were observed. As is apparent from FIGS. 15A to 15C, the orientation direction of the primary reinforcing fiber in the III portion of the center supporting plate was a lateral direction (a longitudinal direction). The longitudinal orientation ratio (D4) of the J portion (a center portion) of the I portion of the center supporting plate shown in FIG. 15B was 68%, and the strength thereof was 91.7%.

As described above, in the present example, it was confirmed that in the top wing plate, the bottom wing plate and the center supporting plate, the reinforcing fiber orientates mainly in a longitudinal direction, and in the rib, the reinforcing fiber orientates mainly in a perpendicular direction. In this case, it was confirmed that the orientation ratios D1 to D3 satisfy the Equation 1, when the longitudinal orientation ratio D1(%) of the longitudinal center portion (the B portion) of the bottom wing plate, the perpendicular orientation ratio D2(%) of the perpendicular center portion (the F portion) of the rib and the perpendicular orientation ratio D3(%) of the perpendicular end portion (the E portion) of the rib.

In this case, it was confirmed that the perpendicular orientation ratio D2 of the perpendicular center portion (the F portion) of the rib was set to be 50% or more and the longitudinal orientation ratio D1 of the longitudinal center portion (the B portion) of the bottom wing plate was set to be 60% or more and the longitudinal orientation ratio D4 of the longitudinal center portion (the J portion) of the center supporting plate was set to be 60% or more.

The invention claimed is:

1. A stabilizer link formed by injection molding using reinforcing fiber containing resin, comprising a support bar for connecting two housings,
   wherein the support bar comprises a top wing plate, a bottom wing plate, a center supporting plate, and a plurality of ribs,
   the top wing plate, the bottom wing plate and the center supporting plate extend to a longitudinal direction of the support bar, and have a I-shape in a cross section perpendicular to the longitudinal direction,
   the plurality of ribs are formed, so as to separate in the longitudinal direction between the top wing plate and the bottom wing plate, and
   when a longitudinal orientation ratio at a longitudinal center portion of the top wing plate and the bottom wing plate is set to be D1(%), a perpendicular orientation ratio at a perpendicular center portion of the ribs is set to be D2(%), and a perpendicular orientation ratio at a perpendicular end portion of the ribs is set to be D3(%), the orientation ratios D1 to D3 satisfy Equation 1, $$D1 > D2 > D3 \quad \text{Equation 1.}$$

2. The stabilizer link according to claim 1, wherein the perpendicular orientation ratio D2 of the perpendicular center portion of the rib is set to be 50% or more.

3. The stabilizer link according to claim 1, wherein the longitudinal orientation ratio D1 of the longitudinal center portion of the top wing plate and the bottom wing plate is set to be 60% or more.

4. The stabilizer link according to claim 1, wherein the longitudinal orientation ratio D4 of the longitudinal center portion of the center supporting plate is set to be 60% or more.

5. The stabilizer link according to claim 1, wherein content of the reinforcing fiber in the resin is 25 to 60% by weight.

6. The stabilizer link according to claim 1, wherein the resin is an engineering plastic or a super engineering plastic.

7. A manufacturing method for the stabilizer link according to claim 1, comprising:
   a step for forming a support bar which inserts resin from a gate in a cavity of a forming die and injection molds;
   a step for forming a top wing plate, a bottom wing plate, and a center supporting plate which extend to a longitudinal direction of the support bar and in which a cross section perpendicular to the longitudinal direction has a I-shape in forming of the support bar; and
   a step for forming a plurality of ribs, so as to separate in the longitudinal direction between the top wing plate and the bottom wing plate,
   wherein when a thickness of the top wing plate and the bottom wing plate is set to be t1, a thickness of the center supporting plate is set to be t2, and a thickness of the plurality of ribs is set to be t3, the thicknesses t1 to t3 satisfy Equations 2 to 4, $$t1 > t2 > t3 \quad \text{Equation 2}$$

$$0.77 \leq t2/t1 \leq 0.85 \quad \text{Equation 3}$$

$$0.77 \leq t3/t2 \leq 0.85 \quad \text{Equation 4.}$$

8. The manufacturing method for the stabilizer link according to claim 7, wherein the thicknesses t1 to t3 are set to be 2.0 mm or more.

9. The manufacturing method for the stabilizer link according to claim 7, wherein in a cross section in a longitudinal direction of the support bar, an aspect ratio, that is, a lateral length/a vertical length, of a quadrilateral shape formed by the center portions of the top wing plate and the bottom wing plate and two ribs connected therewith is set to be a range of 0.8 to 1.2.

10. The manufacturing method for the stabilizer link according to claim 7, wherein the thickness t1 is set to be a range of 3.0 to 4.0 mm.

11. The manufacturing method for the stabilizer link according to claim 7, wherein in the cross section in a longitudinal direction of the support bar, an aspect ratio, that is, a lateral length/a vertical length, of a quadrilateral shape formed by the end portions of the top wing plate and the bottom wing plate and two ribs connected therewith is set to be 0.6 or more.

12. The manufacturing method for the stabilizer link according to claim 7, wherein the minimal curvature radius of bent portion formed at a boundary portion of each plate of the support bar is set to be a range of 0.5 to 1.0.

* * * * *